Patented July 16, 1946

2,403,945

UNITED STATES PATENT OFFICE 2,403,945

MILDEWPROOFING

David M. Musser, Orange, N. J., assignor to Pacific Mills, Boston, Mass., a corporation of Massachusetts No Drawing. Application January 27, 1944, Serial No. 519,951

7 Claims. (Cl. 117—138.5)

This invention relates to the art of mildewproofing fibrous materials and has for its object the provision of novel methods for mildewproofing such materials and the new and improved product thereof. The invention is advantageously applied to the mildewproofing of cotton cloth and other textiles and will be particularly described with reference thereto.

I have discovered that certain acyl compounds of ortho hydroxy diphenyl have superior mildew preventive properties and in addition are practically leach proof and are not steam-distilled at ordinary cloth finishing temperatures. They are the acyl compounds of ortho hydroxy diphenyl in which the acyl group contains an alkyl group and is directly attached to the oxygenated ring of the diphenyl. They are, therefore, represented by the general formula $C_6H_5$—$C_6H_3(OH)(COR)$ wherein R designates an alkyl group (methyl, ethyl, propyl, etc.). The acyl group is preferably in either the meta or para position with respect to the hydroxyl group.

This class of compounds may be prepared from the reaction product of ortho hydroxy diphenyl and either acid anhydride or acid chloride. For example, the acetyl compound, in which the alkyl group designated by R in the general formula above is methyl, may be prepared as follows:

The ortho hydroxy diphenyl is dissolved in benzol or toluene and acetylated with acetic anhydride $((CH_3CO)_2O)$ or acetyl chloride $(CH_3COCl)$ at 130° C. The mixture is distilled to remove the excess products of the reaction and the residue is treated with aluminum chloride and heated at 130° C. This causes a rearrangement of the atoms with resultant formation of aceto ortho hydroxy diphenyl having the formula $C_6H_5$—$C_6H_3(OH)(COCH_3)$. The compound is about one-tenth as water soluble as the original compound and has a melting point of 170° C.

The compounds of the class which contain the higher acyl groups propionyl, butyryl, etc., with the corresponding higher alkyl groups ethyl, propyl, etc., may be prepared in similar manner from the reaction product of ortho hydroxy diphenyl with the appropriate acid anhydride or acid chloride containing the acyl group. The resulting compounds are similar to the acetyl compound, being only very slightly soluble in water and having similarly high melting points, and they possess similar advantages when used as mildewproofing agents according to the invention. The acetyl, propionyl and butyryl compounds of the class are most easily and inexpensively prepared, the acetyl compound being most satisfactory from this standpoint, and these, especially the acetyl compound, are to be considered preferred for purposes of the invention.

It is desirable that the mildewproofing compounds of my invention shall be sufficiently water-insoluble to prevent leaching upon exposure to the weather. Since fungus grows only in a moist environment, the compounds must be sufficiently soluble in water to exert the desired action on the fungus growth. In the appended claims I have used the term "relatively water-insoluble" to mean that the compounds, while sufficiently soluble to be effective mildewproofing agents, are not so soluble as to leach out unduly upon exposure to rain. One acylated compound which proved satisfactory, for example, had a solubility of 0.00508 gram per 100 ml. $H_2O$ at 23° C.

I have found compounds in which the acyl group is in the para position with regard to the hydroxyl group to be particularly effective. I have also found that the presence of a small percentage—possibly 10 to 15%—of a compound in which the acyl group is in either the meta or the ortho position with relation to the hydroxyl group (which compounds are generally of an oily nature) will prevent crystallization of the para compounds, which crystallization would render the para compounds objectionable as mildewproofing agents for application to fabric. The meta or ortho compound is often formed in producing the para compound.

Another way to reduce or prevent crystallization of the para compounds is to mix with them a small amount of a high boiling liquid hydrocarbon, for example 10 to 15% of a hydrocarbon boiling above 300° C.

My novel mildewproofing compounds are readily applicable to cloth in the form of liquid solutions or dispersions, from which they may be precipitated on and between the component fibres in various ways. For example, they are soluble in organic solvents such as benzol, alcohol or dry cleaning solvents and may be applied by impregnation of the cloth with such solutions followed by evaporation of the solvent. They also form water-soluble salts in alkaline solutions, with which a fabric may be impregnated and then treated with an acid to precipitate the water-insoluble compounds in the fabric. Or water-soluble salts of the compounds may be formed with ammonia and these may be applied to cloth in water solution, the cloth being then heated to drive off the combined ammonia, or suitable impregnating emulsions of the compounds may be formed.

Generally, where one of these compounds is used as the only mildewproofing agent, it should, to insure adequate mildewproofing, be present in the finished cloth to the extent of at least 0.25% of the weight of the dried cloth.

As an example of one suitable procedure for applying my novel compounds to cloth, the following may be given:

A bleached cotton fabric was padded with a 1% alkaline solution of the sodium salt of aceto ortho hydroxy diphenyl so that the fabric showed a gain in weight of about 75%, and was then passed through a bath containing dilute acetic acid and dried. The dried fabric contained the diphenyl in amount approximately 0.75% of the weight of the fabric.

The remarkable leach-proof mildew-preventive effects obtained are demonstrated by the fact that when the above fabric was subjected to a leaching test in running water for 24 hours at 65° F. and was then inoculated with *Chaetomium globosum*, mildew growth was completely inhibited.

I claim:

1. A mildewproofed fibrous material rendered resistant to mildew by the presence therein of a relatively water-insoluble ortho hydroxy diphenyl compound containing an acyl group, said acyl group containing an alkyl group and being directly attached to the oxygenated ring of the diphenyl, said acyl group being in a position other than the ortho position in relation to the hydroxyl group of the diphenyl compound.

2. A mildewproofed fibrous material rendered resistant to mildew by the presence therein of a relatively water-insoluble ortho hydroxy diphenyl compound containing an acyl group, said compound being represented by the formula $C_6H_5$—$C_6H_3(OH)(COR)$ wherein R designates an alkyl group.

3. A mildewproofed fibrous material rendered resistant to mildew by the presence therein of a relatively water-insoluble ortho hydroxy diphenyl compound containing an acyl radical selected from the group consisting of acetyl, propionyl and butyryl, said acyl radical being directly attached to the oxygenated ring of the diphenyl and being in a position other than the ortho position in relation to the hydroxyl group.

4. A fibrous material rendered resistant to mildew by the presence therein of an ortho hydroxy diphenyl compound containing an acyl group, said acyl group being directly attached to the oxygenated ring of the diphenyl in the para position in relation to the hydroxyl group, said fabric also containing, mixed with said diphenyl compound, a smaller amount of a second ortho hydroxy diphenyl compound containing an acyl group which is attached to the oxygenated ring of the diphenyl in the meta position in relation to the hydroxyl group.

5. A fibrous material rendered resistant to mildew by the presence therein of an ortho hydroxy diphenyl compound containing an acyl group, said acyl group being directly attached to the oxygenated ring of the diphenyl in the para position in relation to the hydroxyl group, said fabric also containing, mixed with said diphenyl compound, a relatively smaller amount of a high-boiling liquid hydrocarbon.

6. A method of imparting a leach resistant, mildew inhibiting finish to a fibrous material which comprises depositing on and between the component fibres of the material a relatively water-insoluble ortho hydroxy diphenyl compound containing an acyl group, said acyl group containing an alkyl group and being directly attached to the oxygenated ring of the diphenyl.

7. A method of imparting a leach resistant, mildew inhibiting finish to a fibrous material which comprises depositing on and between the component fibres of the material a relatively water-insoluble ortho hydroxy diphenyl compound containing an acyl radical selected from the group consisting of acetyl, propionyl and butyryl, said acyl radical being directly attached to the oxygenated ring of the diphenyl.

DAVID M. MUSSER.